Figure 1:
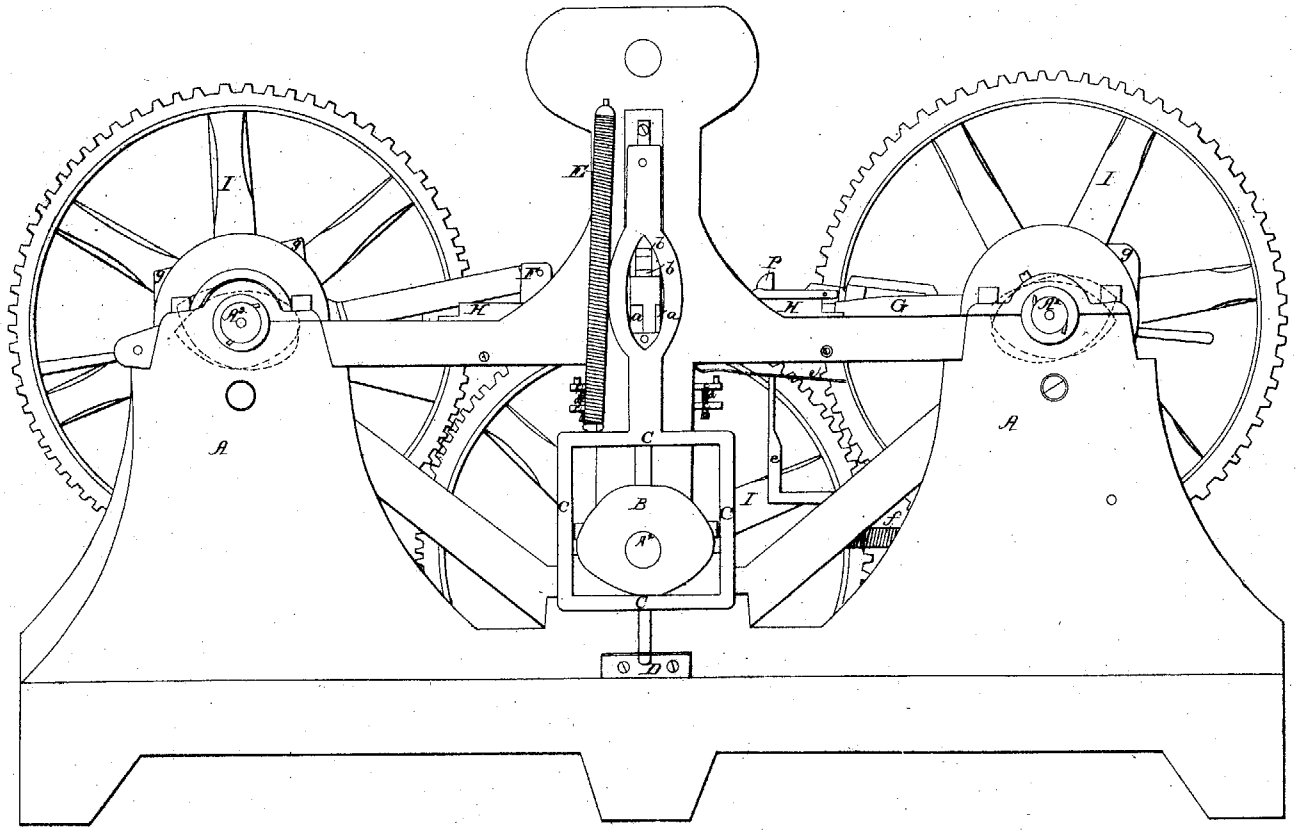

Sheet 1, 2 Sheets.

R. Griffith.

Nut Machine.

No. 411. Reissued Nov. 25, 1856.

THE GRAPHIC CO. PHOTO-LITH. 39 & 41 PARK PLACE, N.Y.

Sheet 2, 2 Sheets.
R. Griffith.
Nut Machine.
No. 411. Reissued Nov. 25, 1856.
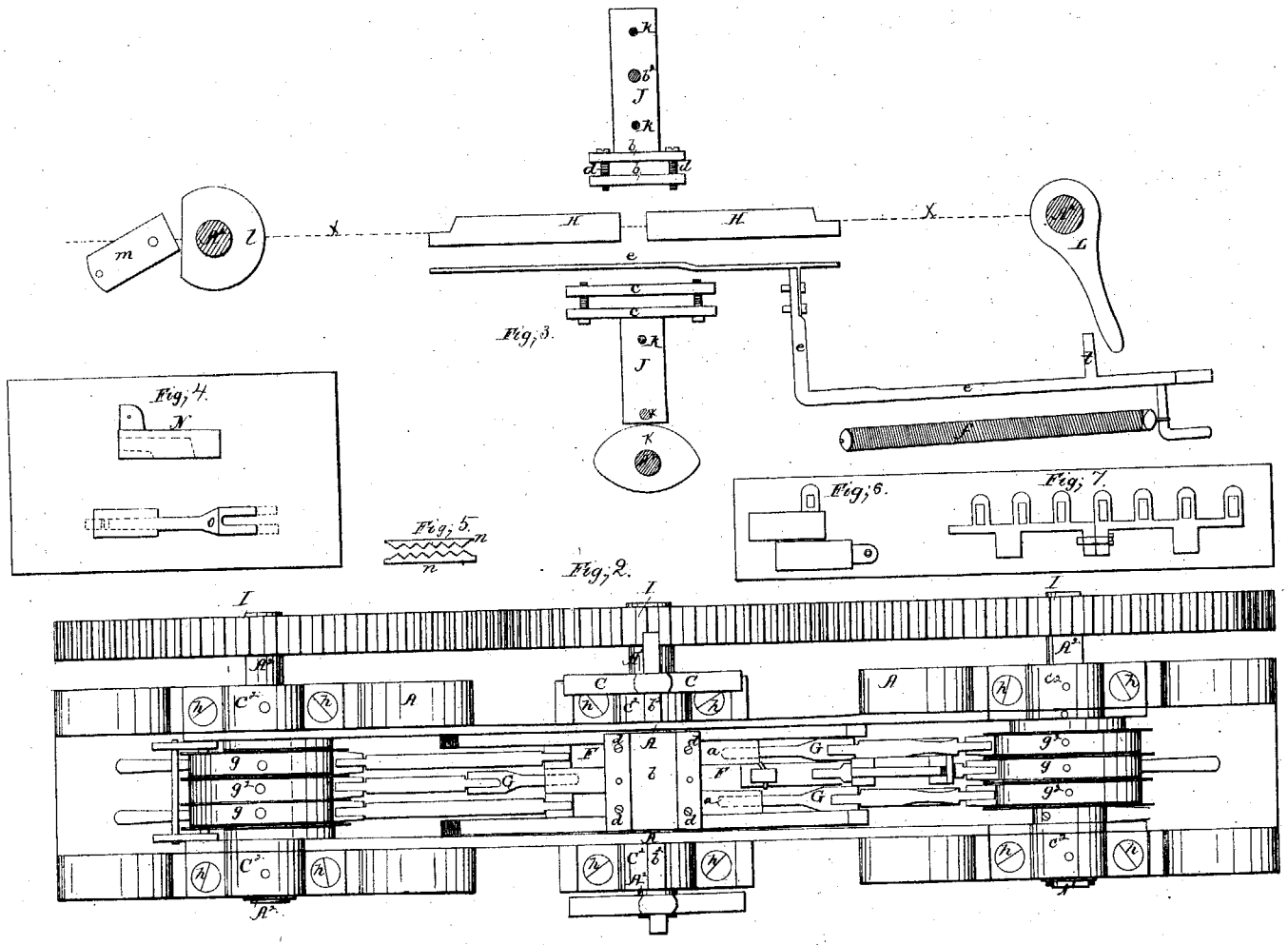
THE GRAPHIC CO. PHOTO-LITH. 39 & 41 PARK PLACE, N.Y.

UNITED STATES PATENT OFFICE.

ROBERT GRIFFITHS, OF PHILADELPHIA, PENNSYLVANIA.

IMPROVEMENT IN NUT-MACHINES.

Specification forming part of Letters Patent No. 13,720, dated October 30, 1855; Reissue No. 411, dated November 25, 1856.

*To all whom it may concern:*

Be it known that I, ROBERT GRIFFITHS, of the city of Philadelphia and State of Pennsylvania, have invented a certain new and useful Mode of Manufacturing Nuts; and I do hereby declare that the following is a full, clear, and exact description of the same, reference being had to the accompanying drawings, and to the letters of reference marked thereon.

My invention consists in the employment for manufacturing nuts of a series of reciprocating boxes and punches and tables (the arrangement of and method of operating which are fully described hereinafter) for the purpose of forming from a heated bar of iron a number of nuts with either four or six sides at one operation.

In order to enable others skilled in the art to make and use my invention, I will now proceed to describe its construction and operation.

On reference to the drawings which form a part of this specification, Figure 1 is a side view. Fig. 2 is a plan or top view. Fig. 3 is a sectional view of the machine with the frame removed. Fig. 4 is a detached view of a stationary box, puncher, and sliding box. Fig. 5 is an edge view of the tables for forming a hexagonal nut. Fig. 6 is a proposed plan of double boxes working above and in advance of each other. Fig. 7 is a plan of fastening the boxes together in whole or in part.

A, Fig. 1, is the frame of the machine; B, a cam for playing in the yoke C, and serving to operate the upper table; D, a bracket for guiding the yoke. $A^2$ $A^2$ $A^2$ are the shafts to which are secured the cams and the cog-wheels; E, the spiral spring for replacing the table; F, the sliding boxes; G, the punchers; H, the stationary sides of the machine, in which the sliding boxes and punchers work, and between which the stationary boxes are placed; I I I, cog-wheels gearing into each other; *a a*, the ends of the cutting-boxes in a position to receive the heated bar; *b b*, the plates of the upper table; *c c*, the plates of the lower table; *d d*, the screws for adjusting the plates; *e*, the scraper for cleaning the table of the nuts deposited thereon; *f*, a spiral spring attached to the scraper for the purpose of replacing the same; *g g*, the yokes in which play the cams on the shafts $A^2$, the position of the cams on the two shafts being indicated by the red lines, Fig. 1.

In Fig. 2, A is the frame; C, the yoke surrounding the cam. B operates the upper table; F, the sliding boxes; G, the punchers; *g*, the square yokes, and $g^2$ the round yokes in which the cams on shaft $A^2$ play; *b*, the upper table; $b^2$, the shaft passing through the frame for lifting and lowering the table; $c^2$, the boxes in which turn the shafts $A^2$; *h h h h*, the screws for the boxes; I I I, the cog-wheels.

In Fig. 3, letter K is one of the cams on the center shaft, $A^2$, for operating the lower table; *d d*, the screws for adjusting the plates of the tables; *e*, the scraper; L, the lever on the shaft $A^2$ for operating the same; *f*, the spring for replacing the scraper; H, the side of the stationary frame, between which the stationary boxes are placed, and the sliding boxes and punchers work; *b b*, the plates of the upper table; *d d*, the screws for adjusting the same; *j j*, slides to which the tables are attached, and which are furnished with screws *k k*. These slides work in slots in the sides of the frame. $A^2$ $A^2$ are the shafts in section with the washer L; *m*, the rear portion attached to the square yokes *g*.

In Fig. 4, N is one of the boxes, the dotted lines showing an opening for the escape of the punchings; O, a puncher, the dotted lines showing its passage through the stationary box.

In Fig. 5, *n n* is an edge view of the grooved table for forming the hexagonal nuts.

Operation: The heated bar is inserted through the slot *a* in the upright portion of the yoke C, and is received between the cutting and sliding boxes and the stationary boxes *a a*. The cog-wheels are set in motion and cause the cams shown in red lines on shaft $A^2$ in Fig. 1 to operate on the yokes $g$ $g$ $g^2$ $g^2$, which cause the sliding boxes and the punchers to move forward, passing the stationary boxes, thus cutting the bar into nuts, and punching them at the same time, and the punchings are discharged, as shown at N, Fig. 4. The punchers slide forward and passing through the nut enter into the box far enough for it to receive the punchings. Simultaneously with the above movement the cams B on the central shaft, $A^2$, operate the upper table, and the cams K on the same shaft the lower table, thus causing the two tables to approach each other, firmly pressing the heated bar at the point of time when the sliding boxes and punchers pass the stationary boxes, as before described. As soon as the nuts are thus made the tables recede from each other, and the nuts fall upon the lower table as the latter descends. The scraper *e* with its short vertical arm *t* on its upper side, is caught by the lever L, which carries it back, and as it passes over the top of the lower table scrapes the nuts off it, after which the lever L passes the vertical arm *t*, and the spiral spring *f* throws the scraper back preparatory to a second operation.

I propose using, when desired, the grooved tables, as seen in Fig. 5, for the purpose of making hexagonal nuts. These tables can be inserted instead of the smooth ones, as seen in the machine.

Having thus fully described the construction and operation of my machine, what I claim as new, and desire to secure by Letters Patent, is—

A combination, substantially as herein described, of tables, boxes, and punchers, the same being arranged and operated in the manner set forth or any eqivalent thereto, for the purpose specified.

ROBERT GRIFFITHS.

Witnesses:
HENRY HOWSON,
WILLIAM E. WALTON.